United States Patent [19]

Miale et al.

[11] Patent Number: 4,596,704

[45] Date of Patent: Jun. 24, 1986

[54] ACTIVATION OF ZEOLITES

[75] Inventors: Joseph N. Miale, Lawrenceville; Clarence D. Chang, Princeton, both of N.J.

[73] Assignee: Mobil Oil Corporation, New York, N.Y.

[21] Appl. No.: 716,518

[22] Filed: Mar. 26, 1985

Related U.S. Application Data

[63] Continuation of Ser. No. 554,376, Nov. 22, 1983, abandoned, which is a continuation of Ser. No. 355,446, Mar. 8, 1982, abandoned.

[51] Int. Cl.⁴ .............................................. C01B 33/28
[52] U.S. Cl. ..................................... 423/328; 502/77; 502/85; 502/86
[58] Field of Search .................... 423/328; 502/77, 85, 502/86

[56] References Cited

U.S. PATENT DOCUMENTS 4,427,787  1/1984  Miale et al. ........................... 502/71
4,427,789  1/1984  Miale et al. ........................... 502/71

*Primary Examiner*—William R. Dixon, Jr.
*Assistant Examiner*—Steven Capella
*Attorney, Agent, or Firm*—Alexander J. McKillop; Michael G. Gilman; Dennis P. Santini

[57] ABSTRACT

A method for enhancing the activity of a synthetic crystalline zeolite, including a zeolite having a silica-to-alumina ratio greater than 500, is disclosed which involves compositing the zeolite with an alumina support matrix and reacting the composite with a concentrated aqueous solution of an ammonium halide preferably ammonium fluoride. The halide treated zeolite subsequently is contacted with an ammonium salt such as ammonium nitrate and subsequently is calcined.

12 Claims, No Drawings

ACTIVATION OF ZEOLITES

CROSS-REFERENCE TO RELATED CASES

This is a continuation of copending application Ser. No. 559,376, filed on Nov. 22, 1983, abandoned, which is a continuation of Ser. No. 355,446 filed 3/8/82, abandoned.

This application is related to copending applications identified as follows:

| Serial Number | Filing Date |
| --- | --- |
| 319,175 Pat. No. 4,438,215 | November 9, 1981 |
| 333,370 Pat. No. 4,444,902 | December 22, 1981 |
| 355,419 abandoned | March 8, 1982 |
| 355,417 Pat. No. 4,427,790 | March 8, 1982 |
| 355,415 Pat. No. 4,427,788 | March 8, 1982 |
| 355,413 Pat. No. 4,427,787 | March 8, 1982 |
| 355,418 Pat. No. 4,427,786 | March 8, 1982 |
| 355,416 Pat. No. 4,427,789 | March 8, 1982 |
| 355,414 Pat. No. 4,427,791 | March 8, 1982 |
| 355,420 abandoned | March 8, 1982 |

BACKGROUND OF THE INVENTION

1. Field of the Invention

This invention relates to a method for enhancing the acid activity high silica-containing synthetic crystalline materials, which involves the sequential steps of combining same with a support matrix of alumina, gallia, boria or a mixture of silica and alumina, reacting the resulting composite with an ammonium halide solution, treating the reacted composite by contact with an aqueous solution of an ammonium salt, and calcining the resulting material. The resulting supported zeolite composition exhibits enhanced Bronsted acidity. This process is also useful in regenerating spent zeolite catalyst materials.

2. Description of Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejection those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework SiO$_4$ and AlO$_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated convenient symbols, as illustrated by zeolite ZSM-5 (U.S. Pat. No. 3,702,886).

High silica-containing synthetic zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describe microporous crystalline silicas or organo silicates wherein the aluminum content present is at impurity levels.

Because of the extremely low aluminum content of these high silica-containing synthetic zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

The novel process of this invention permits the preparation of certain synthetic high silica-containing materials which have all the desirable properties inherently possessed by such high silica materials and, yet, have an acid activity which heretofore has only been possible to be achieved by materials having a higher aluminum content in their "as synthesized" form. It further permits valuable activation of crystalline zeolites having much lower silica-to-alumina mole ratios.

U.S. Pat. No. 3,933,983 discloses the treatment of crystalline zeolites with a dilute solution of a fluorine compound and subsequent exchange with an ammonium ion. Treatment of high silica zeolites is not, however, suggested.

SUMMARY OF THE INVENTION

The present invention relates to a novel process for improving acid activity of synthetic crystalline aluminosilicate zeolites, including high silica-containing synthetic crystalline zeolites, which comprises the sequential steps of incorporating the zeolite, either "as synthesized" or initially ion-exchanged, with a support matrix material of alumina, a mixture of silica and alumina, gallia or boria, reacting the resulting composite with a concentrated aqueous solution of an ammonium halide, preferably ammonium fluoride, for a predetermined period of time treating the halide reacted extrudate by contact with an ammonium salt solution, and calcining theresulting extrudate material. The resulting calcined extrudate material exhibits enhanced Bronsted acidity and, therefore, improved acid activity toward catalysis of numerous chemical reactions, such as, for example, cracking of organic, e.g. hydrocarbon, compounds.

DESCRIPTION OF SPECIFIC EMBODIMENTS

The novel process of this invention is concerned with the treatment of synthetic crystalline zeolites, including high silica containing synthetic crystalline material. The expression "high silica-containing crystalline material" is intended to define a crystalline structure which has a silica-to-alumina ratio greater than 500 and more preferably greater than 1000, up to and including those highly siliceous materials where the silica-to-alumina ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to the impurity of the synthesis reaction solutions. It is to be understood that the expression "high silica-containing crystalline material" also specifically includes those materials which have other metals besides silica and/or alumina associated therewith, such as boron, iron, chromium, etc. Thus, the starting materials utilized in the novel process of this invention may have a silica-to-alumina ratio greater than about 500 (irrespective of what other materials or metals are present in the crystal structure).

The synthetic zeolite starting materials utilized herein, including those having a silica-to-alumina mole ratio greater than about 500, may be prepared from reaction mixtures containing sources of various cations. The present process provides noted improvement regardless of which cation sources are present in said reaction mixtures. Non-limiting examples of cation sources to be used in the manufacture of the zeolite starting materials include amines, diamines, pyrrolidine, onium compounds and compounds containing multiple cationic centers. Examples of onium compounds are those having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

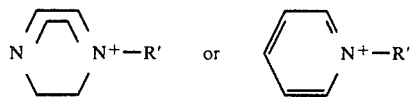

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

The compounds containing multiple cationic centers include those having the formula:

$$[(R)_3M^+(Z)_nM^+(R)_3](X^-)_2$$

wherein R, M and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

$[(CH_3)_3As^+(CH_2)_6N^+(CH_3)_3](Cl^-)_2$,
$[(C_3H_7)_3N^+(CH_2)_{10}N^+(C_3H_7)_3](Cl^-)_2$,
$[(C_6H_5)_3N^+(C_2H_4)_{16}P^+(C_6H_5)_3](OH^-)_2$,
$[(C_{18}H_{37})_3P^+(C_2H_2)_3P^+(CH_3)_3](Cl^-)_2$,
$[(C_2H_5)_3N^+(C_6H_4)N^+(C_2H_5)_3](Br^-)_2$,
$[(CH_3)_3Sb^+(CH_2)_{10}Sb^+(CH_3)_3](Cl^-)_2$,
$[(C_6H_5)_3Sb^+(CH_2)_4N^+(CH_3)_3](OH^-)_2$,
$[(CH_3)_3Bi^+(CH_2)_{18}N^+(CH_3)_3](Br^-)_2$,
$[(C_2H_3)_3N^+(CH_2)_{50}N^+(C_2H_3)_3](OH^-)_2$,
$[(C_6H_5)_3P^+(C_2H_2)_6As^+(CH_3)_3](Cl^-)_2$,
$[(CH_3)_3N^+(CH_2)_6N^+(CH_3)_3](Cl^-)_2$, and

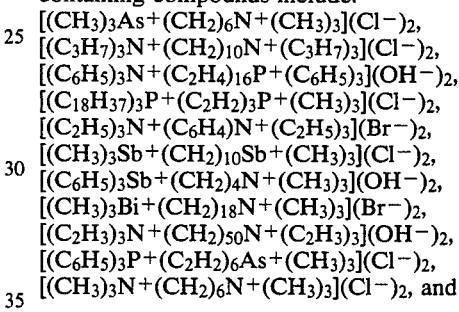

The novel process of this invention is carried out by incorporating the crystalline zeolite material with a support matrix material which is alumina, an alumina-silica mixture, gallia or boria, reacting the composite with concentrated aqueous solution of an ammonium halide, preferably a fluoride of from about 1 Normal to saturated (about 12 Normal), said reaction being conducted at a temperature of from about 0° C. to about 90° C., preferably from about ambient to about 50° C., for a time of less than about 60 minutes, preferably from about 10 minutes to less than about 60 minutes. The ammonium halide reacted composite is dried at about 110° to 130° C. and then treated by contact with an ammonium salt solution, e.g. 1N NH$_4$NO$_3$, at from about 0° C. to about 90° C., and thereafter calcined at a temperature of from about 200° C. to about 600° C. in an inert atmosphere of air, nitrogen, etc. at subatmospheric, atmospheric or superatmospheric pressures for from about 1 minute to about 48 hours.

The amount of halide salt which is utilized is from about 0.1 to about 0.5 grams of halide per gram of crystalline zeolite material in the composite.

The treatment with the aqueous ammonium halide salt solution can be conducted for a period of time of from about 1 hour to about 20 hours. The ammonium salt used is not narrowly critical and will normally be an inorganic salt such as ammonium nitrate, ammonium sulfate, ammonium chloride, etc. The aqueous ammonium salt solution will be from about 0.1 to about 2 Normal.

The support matrix material combined with the crystalline zeolite in the initial step of the present method may be in the form of a gel, if desired, and the relative proportion of zeolite component and support matrix material component, on an anhydrous basis, may vary with the zeolite content ranging from about 25 to about 75 weight percent of the dry composite. The support matrix can be alumina, a mixture of silica and alumina, boria or gallia.

Of the high silica zeolite materials advantageously treated in accordance herewith, zeolites ZSM-15, ZSM-11, ZSM-12, ZSM-23, ZSM-35, ZSM-38 and ZSM-48 are particularly noted. ZSM-5 is described in U.S. Pat. Nos. 3,702,886 and Re. 29,948, the entire contents of each being hereby incorporated by reference herein. ZSM-11 is described in U.S. Pat. No. 3,709,979, the teaching of which is incorporated herein by reference. ZSM-12 is described in U.S. Pat. No. 3,832,449, the contents of which are incorporated herein by reference. ZSM-23 is described in U.S. Pat. No. 4,076,842, the teaching of which is incorporated herein by reference. The contents of U.S. Pat. Nos. 4,016,245 and 4,046,859, describing ZSM-35 and ZSM-38, respectively, are incorporated herein by reference.

ZSM-48 can be identified, in terms of moles of anhydrous oxides per 100 moles of silica as follows:

(0.05 to 5)$N_2O$:(0.1 to 10)$M_{2/n}O$:(0 to 4)$Al_2O_3$:(100)$SiO_2$ wherein M is at least one cation having a valence n, N is a mixture of a $C_2$–$C_{12}$, and more preferably of a $C_3$–$C_5$, alkylamine and a tetramethylammonium compound and wherein the composition is characterized by the distinctive X-ray diffraction pattern as shown below:

| Characteristics Lines of Zeolite ZSM-48 | |
| --- | --- |
| d (A) | Relative Intensity (I/Io) |
| 11.8 ± 0.2 | S |
| 10.2 ± 0.2 | W-M |
| 7.2 ± 0.15 | W |
| 4.2 ± 0.08 | VS |
| 3.9 ± 0.08 | VS |
| 3.6 ± 0.06 | W |
| 3.1 ± 0.05 | W |
| 2.85 ± 0.05 | W |

These values were determined by standard techniques. The radiaion was the K-alpha doublet of copper, and a diffractometer equipped with a scintillation coutner and a strip chart pen recorder was used. The peak heights, I, and the positions as a function of two times theta, where theta is the Bragg angle, were read from the spectrometer chart. From these, the relative intensities, 100 I/$I_o$, where $I_o$ is the intensity of the strongest line or peak, and d (obs.), the interplanar spacing in Angstroms (A) corresponding to the recorded lines, were calculated. In the foregoing table the relative intensities are given in terms of the symbols W=weak, VS=very strong, M=medium and W-M=weak-to-medium (depending on the cationic form). Ion exchange of the sodium ion with cations reveals substantially the same pattern with some minor shifts in interplanar spacing and variation in relative intensity. Other minor variations can occur depending on the silica to aluminum ratio of the particular sample, as well as if it has been subjected to thermal treatment.

ZSM-48 can be prepared from a reaction mixture containing a source of silica, tetramethylammonium compound, $C_2$–$C_{12}$ alkylamine, an alkali metal oxide, e.g. sodium, with or without a source of alumina, and water, and having a composition, in terms of mole ratios of oxides, falling within the following ranges:

| REACTANTS | BROAD | PREFERRED |
| --- | --- | --- |
| $Al_2O_3/SiO_2$ | 0 to 0.08 | 0 to 0.02 |
| $Na_2O/SiO_2$ | 0.01 to 1.0 | 0.1 to 0.5 |
| $N_2O/SiO_2$ | 0.005 to 0.5 | 0.005 to 0.25 |
| $OH^-/SiO_2$ | 0.01 to 0.5 | 0.05 to 0.2 |
| $H_2O/SiO_2$ | 10 to 200 | 20 to 100 | wherein N is a mixture of a $C_2$–$C_{12}$ alkylamine and tetramethylammonium compound, and maintaining the mixture at 80°–200° C. until crystals of ZSM-48 are formed.

The molar ratio of $C_2$–$C_{12}$ alkylamine to tetramethyl ammonium compound is not narrowly critical and can range from 1:1 to 10:1. The tetramethylammonium compound can include the hydroxide or halide with the chloride being particularly preferred.

The original cations of ZSM-48 can be replaced, at least in part, by calcination and/or ion exchange with another cation. Thus, the original cations are exchanged into a hydrogen or hydrogen ion precursor form or a form in which the original cation has been replaced by a metal of Groups II through VIII of the Periodic Table. Thus, for example, it is contemplated that the original cations can be replaced with ammonium ions or with hydronium ions. Catalytically active forms of these would include, in particular, hydrogen, rare earth metals, aluminum, metals of Groups II and VIII of the Periodic Table and manganese.

The activity enhanced materials prepared by the present process are useful as catalyst components for acid catalyzed organic compound conversion reactions. Such reactions include, as non-limiting examples, cracking of hydrocarbons, wherein the reaction conditions include a temperature of from about 300° C. to about 800° C., a pressure of from about 15 psia to about 500 psia, and a weight hourly space velocity of from about 0.1 to about 20; and conversion of methanol to gasoline wherein the reaction conditions include a temperature of from about 300° C. to about 550° C., a pressure of from about 5 psia to about 500 psia, and a weight hourly space velocity of from about 0.1 to about 100.

In practicing a particularly desired chemical conversion process, it may be useful to incorporate the above-described activity enhanced material with additional matrix comprising another material resistant to the temperature and other conditions employed in the process. Such matrix material is useful as a binder and imparts additional resistance to the catalyst for the severe temperature, pressure and reactant feed stream velocity conditions encountered in many cracking processes.

Useful additional matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing additional matrix materials, the catalyst employed herein may be composited with an additional porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The additional matrix may be in the form of a cogel. The relative proportions of activity enhanced supported zeolite component and additional matrix, on an anhydrous basis, may vary widely with the zeolite content of the supported zeolite component ranging from about 1 to about 99 percent by weight and more usually in the range of about 5 to about 80 percent by weight of the total dry composite.

The following example will illustrate the novel method of the present invention.

EXAMPLE 1

Zeolite ZSM-5 was prepared from a reaction mixture containing tetraalkylammonium ions. It had a silicon-to-alumina mole ratio of about 26,000:1 (65 ppm framework alumina, 110 ppm bulk alumina and 0.23 percent sodium).

An aliquot of 65 parts of the pure zeolite was combined and extruded with 35 parts of pure $\gamma$-alumina. A 0.6 gram sample of the extrudate was vacuum impregnated with a saturated solution of aqueous ammonium fluoride (approximately 12 Normal) for reaction at ambient temperature. After 30 minutes reaction time, the extrudate was dried at 130° C. and treated three times with 1N $NH_4NO_3$ solution, each treatment was followed with hot water washing. The extruded product was then calcined at 538° C. for 30 minutes in air to provide the desired product. The sample was tested for hexane cracking and constraint index. Results are shown below:

| CATALYST EVALUATION | | |
| --- | --- | --- |
| SAMPLE | $\alpha$ | C.I. (650° F.) |
| Starting Extrudate | 0.2 | — |
| Final Preparation | 140 | 3.9 |
| $\gamma$-Alumina | 0.2 | — |

Above results show enhanced Bronsted activity which can only result from addition of aluminum to the zeolite structure to create new acid sites.

As indicated above the process of this invention is adaptable to the regeneration of spent zeolite catalysts no longer useful in such processes as cracking or dewaxing. These catalysts ordinarily will have been sufficiently treated by combustion as to be substantially free of carbon deposits, but will nevertheless have lost their activity. These catalysts, including zeolite materials which have been composited with silica, alumina, silica-alumina mixtures as well as other previously described matrix mixtures are subjected to the ammonium halide (preferably fluoride) treatment followed by ion exchange with an aqueous solution of ammonium salts as described previously.

What is claimed is:

1. A method for increasing the catalytic acid activity of a crystalline zeolite having a silica to alumina ratio greater than 500 and selected from the group consisting of ZSM-5, ZSM-11, ZSM-12, ZSM-23, ZSM-35, ZSM-38 and ZSM-48, which method comprises:

forming a composite of said zeolite with a matrix material selected from the group consisting of alumina, silica-alumina, boria, gallia and mixtures thereof;

contacting said composite with an aqueous solution consisting essentially of at least about one mol ammonium fluoride per liter of said solution, said contacting being at about 0° C. to about 90° C. for a time less than about 60 minutes; and calcining said contacted zeolite.

2. The method of claim 1 wherein said matrix material is alumina.

3. The method of claim 1 wherein said matrix material is alumina, said method including the step of ion-exchanging with ammonium nitrate, ammonium sulfate or ammonium chloride said contacted composited and the step of water-washing said ion-exchanged composite before said calcining step.

4. The method of claim 1 wherein said zeolite is in the as-synthesized state.

5. The method of claim 1 wherein said zeolite is ZSM-5 or ZSM-11.

6. The method of claim 2 wherein said zeolite is ZSM-5 or ZSM-11.

7. The method of claim 3 wherein said zeolite is ZSM-5 or ZSM-11.

8. The method of claim 4 wherein said zeolite is ZSM-5 or ZSM-11.

9. A method for increasing the catalytic acid activity of a composite comprising on a dry basis about 25 wt% to 75 wt% of a crystalline zeolite and a matrix material selected from the group consisting of alumina, silica-alumina, boria, gallia and mixtures thereof, said zeolite having a silica to alumina ratio greater than 500 and selected from the group consisting of ZSM-5, ZSM-11, ZSM-12, ZSM-23, ZSM-35, ZSM-38 and ZSM-48, which method comprises:

contacting said composite with a concentrated aqueous solution of ammonium fluoride at about 0° C. to about 90° C. for a time less than about 60 minutes; and calcining said contacted zeolite.

10. The method described in claim 9 wherein said zeolite is ZSM-5 or ZSM-11 and said matrix material is alumina or silica-alumina.

11. The method described in claim 9 wherein said composite used in said contacting step is a spent zeolite catalyst.

12. The method described in claim 10 wherein said composite used in said contacting step is a spent zeolite catalyst.

* * * * *